(12) United States Patent
Greenberg et al.

(10) Patent No.: US 6,479,007 B1
(45) Date of Patent: Nov. 12, 2002

(54) APPARATUS AND METHOD FOR CONTROLLING PORE SIZE IN POLYMERIC MEMBRANES AND THIN FILMS

(75) Inventors: Alan R. Greenberg, Boulder, CO (US); William B. Krantz, Cincinnati, OH (US); Andrew E. Neice, Thornton, CO (US); Paul W. Todd, Greenville, IN (US)

(73) Assignee: University Technology Corporation, Boulder, CO (US)

( * ) Notice: Subject to any disclaimer, the term of this patent is extended or adjusted under 35 U.S.C. 154(b) by 200 days.

(21) Appl. No.: 09/595,213

(22) Filed: Jun. 16, 2000

Related U.S. Application Data

(60) Provisional application No. 60/154,310, filed on Sep. 16, 1999.

(51) Int. Cl.[7] ............................ B29C 35/08; B29C 67/20
(52) U.S. Cl. .......................... 264/413; 264/41; 264/216; 264/425; 425/174.8 E; 425/224
(58) Field of Search ........................... 264/41, 216, 413, 264/425; 425/174.8 E, 224; 210/500.21, 500.23

(56) References Cited

U.S. PATENT DOCUMENTS

| | | |
|---|---|---|
| 3,744,642 A | 7/1973 | Scala et al. |
| 3,945,926 A | 3/1976 | Kesting |

FOREIGN PATENT DOCUMENTS

| | | |
|---|---|---|
| WO | WO00/08237 | 2/2000 |

OTHER PUBLICATIONS

S. Krozer et al., "Precipitation ofPolymers from Solution in the Presence of an Electrical Field," J. Polymer Science, Symposium No. 2, pp. 1217–1227 (1973), John Wiley and Sons, Inc.

J. B. McLaughlin et al., "Increased Flow Rate of Polymer Solutions in Electric Fields," Journal of Colloid and Interface Science, vol. 65, No. 3, pp. 581–582, Jul., 1978 Academic Press.

Herve Marand et al., "Isothermal Crystallization of Poly(vinylidene fluoride) in the Presence of High Static Electric Fields. II. Effect of Crystallization Temperature and Electric Field strength on the Crystal Phase Content and Morphology," Journal of Polymer Science: Part B: Polymer Physics, vol. 27, pp. 1089–1106 (1989), John Wiley and Sons, Inc.

Saeed S. Shojaie et al., "Use of an electric field to alter membrane morphology in a polysulfone–polyvinyl–pyrrolidone blend," Journal of Membrane Science, vol. 79, pp. 115–122 (1993), Elsevier Publishers, B.V.

Erik Schaeffer et al., "Electrically induced structure formation and pattern transfer," Nature, vol. 403, Feb. 24, 2000, pp. 674–677.

*Primary Examiner*—Leo B. Tentoni
(74) *Attorney, Agent, or Firm*—Gary C Cohn PLLC

(57) ABSTRACT

An apparatus and method for controlling the pore structure of thin polymeric sheets, such as porous membranes and thin films, during solvent casting or interfacial polymerization. The invention may be used to reduce or eliminate macrovoid pore defects from solvent-cast or interfacially polymerized polymeric membranes used in a variety of separations or controlled release tasks or to create a desired pore structure in porous thin films, such as may be used in breathable garments, surgical dressings, and screen printing. A nonuniform electric field is generated at one or more locations in proximity to a liquid film in which a desired pore structure is to be formed. Due to the difference in dielectric constant between the liquid within the pores and that in the surrounding liquid, the electric field causes an attractive or repulsive force on the evolving pores.

52 Claims, 5 Drawing Sheets

Macrovoids

Macrovoids

APPARATUS AND METHOD FOR CONTROLLING PORE SIZE IN POLYMERIC MEMBRANES AND THIN FILMS

This application claims benefit under 35 USC §119(e) of provisional application Ser. No. 60/154,310, filed Sep. 16, 1999, the specification of which is incorporated herein by reference in its entirety.

BACKGROUND OF THE INVENTION

1. Field of the Invention

The present invention relates generally to an apparatus and method for controlling the structure of porous membranes or thin films utilizing a nonuniform electric field. More particularly, the apparatus and method may be used to reduce or eliminate macrovoid pore defects or to create a desired pore structure in polymeric membranes or thin films.

2. Description of Related Art

Both membranes and thin porous films are barrier layers that permit the passage of some particles, colloidal or molecular aggregates, molecules, or ions relative to others. Membranes are distinguished from thin films in that they are used either to separate or release at a controlled rate these particulate, colloidal, molecular, or ionic components. Typical applications of membranes include the production of fresh water from sea-water and the controlled release of drugs and pharmaceuticals via transdermal devices. Porous thin films are used in non-separations or non-controlled release applications in which it is desirable to pass one or more components through the film in one direction while preventing the passage of the components through the porous thin film in the opposite direction. Typical applications of thin porous films include breathable garments, surgical dressings, and screen-printing media.

Although membranes and porous thin films can be formed from ceramic and metallic materials, most commercial membranes and thin porous films are made from polymeric materials. Polymeric membranes and thin films are often produced by a phase-inversion casting process, in which a single phase polymer solution inverts into a two-phase dispersion consisting of a polymer-lean phase and a polymer-rich phase. The single-phase solution is formed from one or more polymers, one or more solvents for the polymer or polymers, and, possibly, one or more nonsolvents or other additives, such as plasticizers, surfactants, and nucleating agents. In phase-inversion casting processes, typically, the polymer-lean phase is initially dispersed in the polymer-rich phase. The polymer-rich phase then becomes the structural matrix of the membrane or porous thin film, and the polymer-lean phase becomes the pores. The phase inversion may be accomplished by wet casting, where the solution is immersed into a bath of one or more nonsolvents; by dry casting, where one or more solvents are evaporated from the dispersion; or by thermal casting, where the temperature is altered, causing the latent solvent or solvents to lose their solvent action for the polymer or polymers.

Membranes and thin films can also be prepared by interfacial polymerization processes, in which polymerization occurs at the interface between two immiscible liquids. When the two solutions come in contact with each other, polymerization begins at the interface and proceeds until a thin film is formed between the two phases. The polymerization reaction is limited by the mutual solubilities of the liquids, and the formation process is self-limiting. The polymeric layers are generally quite thin, often less than 1 micron in thickness.

During the fabrication of polymeric membranes or porous thin polymeric films by phase-inversion or interfacial polymerization processes, it is common for large pores, or macrovoids to form. Macrovoids typically have diameters of 10 to 50 microns, and they can extend a substantial distance through the thickness of a polymeric membrane or thin film. Usually, macrovoids are considered to be defects in polymeric membranes, because they reduce the useful volume of the membrane, cause pinholes that reduce the selectivity of the membrane, and can lead to structural failure in higher pressure separation applications.

However, macrovoid pores can also be useful in applications where large pores are desired. For example, uniform color intensity is obtained with printing media having pores that are uniformly distributed on the surface to which ink is applied, but which have a uniform depth and do not penetrate completely through the medium.

It is well known that macrovoids form in polymeric membranes when the casting process occurs very rapidly. In wet-casting, this occurs when the exchange of solvent and nonsolvent between the polymer solution and nonsolvent bath occurs very rapidly. In dry-casting, this occurs when the polymer solution contains a relatively large amount of nonsolvent or nonsolvents, and the solvent evaporates very rapidly. In thermal casting, this occurs when very rapid cooling causes a high degree of supersaturation in the polymer solution.

The size and distribution of pores can be controlled in a variety of ways. These include varying the composition of the initial casting solution from which the polymeric membrane or thin film is made; varying the initial thickness of the cast polymeric membrane or thin film; varying the composition of the ambient gas phase in the case of dry-casting or the nonsolvent immersion bath in the case of wet-casting; and adding nucleating agents, surfactants, plasticizing agents, or viscosity-enhancing agents to the polymer casting solution. For example, macrovoid formation can be reduced or eliminated by delaying phase-inversion, such as by including some solvent in the nonsolvent bath in wet-casting or by reducing the amount of nonsolvent in the polymer solution in dry-casting. Other ways to reduce or eliminate macrovoids include casting thinner membranes or films, increasing the viscosity of the polymer solution, and adding surfactants to the casting solution or nonsolvent bath.

However, these process alterations can cause other undesirable changes in the membrane or thin-film structure. In particular, decreasing the rate at which phase-inversion occurs can cause a thicker "skin" to form at the interface between the polymer solution and the nonsolvent bath in wet-casting or between the polymer solution and ambient gas phase in dry-casting. In some cases, a very thin skin layer, typically 0.01 to 0.1 microns, is desirable, since it provides a highly selective layer that can discriminate between different molecular species. Generally, a skin layer significantly thicker than 0.1 microns is undesirable, because it results in uneconomically low permeation rates.

SUMMARY OF THE INVENTION

It is an object of the present invention to provide an apparatus and method for controlling macrovoid formation in polymeric membranes and thin films.

It is a further object of the present invention to provide an apparatus and method for reducing or eliminating the formation of macrovoids in polymeric membranes and thin films, without altering the composition or thickness of the casting solution or the composition of the nonsolvent bath.

It is yet another object of the present invention to provide an apparatus and method for creating macrovoid pores of a desired size, depth, and or spatial distribution in polymeric membranes and thin films.

It is yet a further object of the present invention to provide an apparatus and method for controlling the size, depth, and spatial distribution of pores that are formed during processes for forming membranes and thin films, including phase-inversion processes, via a means that does not cause other undesirable effects such as thinner membranes or films, or less than optimal membrane or thin-film structure.

To achieve the foregoing and other objects and in accordance with the purpose of the present invention broadly described herein, one embodiment of this invention comprises an apparatus for controlling the number and size of pores in a dielectric material formed by phase-inversion casting or interfacial polymerization from a precursor solution layer. In the casting process, the solution layer and the dielectric material each have a free surface side and a support side. The apparatus comprises at least one first electrode positionable on the free surface side of the dielectric material and a means for maintaining the first electrode at an electrical potential sufficient to provide an electric field through the precursor solution layer. The means for maintaining the first electrode at the electrical potential may comprise a battery or an ac or dc power supply, with one terminal connected to the first electrode. The other terminal of the battery or power supply may be connected to a second electrode on either side of the precursor solution, or the second terminal and the support side of the precursor solution may be connected to ground. Preferably, the dielectric material is a polymeric membrane or a polymeric thin film. The electrodes and the means for maintaining the electric field may be selected to control the size, depth, and number of pores in the dielectric material, or to decrease or eliminate the formation of macrovoid pores. The first electrode may be configured to provide a non-uniform electric field, such as by using a cylindrical rod or by attaching one or more conductive elements, such as rods, or by using a screen as the first electrode. If the apparatus is used for a wet-casting process, the portions of the first electrode and any attached conducting elements that are immersed in the nonsolvent bath should be electrically insulated.

In another embodiment, the present invention comprises an apparatus for phase-inversion casting or interfacial polymerization of dielectric materials. The apparatus includes means for supporting a precursor solution layer during a casting process, at least one first electrode positionable on the free surface side of the solution layer, and means for maintaining at least one first electrode at an electrical potential sufficient to provide the electric field. The apparatus may be adapted for use in a batch-wise or continuous casting process, and the process may include dry casting, wet casting, thermal casting, interfacial polymerization, combinations thereof, and modifications thereof. The means for supporting the precursor solution may comprise at least one material selected from metals, glasses, ceramics, microporous polymer films, webbing, fabrics, and composite materials, and it may be adapted for casting the dielectric material into a shape selected from flat sheets, pleated flat sheets, hollow fibers, and tubes. The apparatus may be adapted to use a non-uniform electric field to control the number, size, and/or depth of pores, including macrovoid pores, in the dielectric materials.

In yet another embodiment, the present invention comprises a method for controlling the number and size of pores in a dielectric material formed by phase-inversion casting from a precursor solution layer, wherein the solution layer and the dielectric material each have a free surface side and a support side. The method comprises the steps of positioning the precursor solution layer between a first electrode on the free surface side of the solution and a support for the cast material, providing an electric field between the first electrode and the support, and allowing the precursor solution layer to separate into two phases. The electric field may be provided with a power source, such as a battery or an ac or dc power supply, having one terminal in contact with the first electrode. Additionally, a second electrode may be provided on the support side of the solution layer, in electrical contact with the second terminal of the power supply. Alternatively, the second terminal and the apparatus may be grounded. The precursor solution may comprise a polymer or a polymer precursor; and the dielectric material may comprise a polymer membrane or polymer thin film. The first electrode may be configured as a screen, rod, or similar array of conductors, and one or more conductive elements may be attached to the first electrode and spaced apart from the precursor solution or dielectric material. The method may be used to control the number, size, and/or depth of pores, including macrovoid pores, in the dielectric material.

Still another embodiment of the present invention comprises a method for phase-inversion casting a dielectric material from a precursor solution layer, wherein the solution layer and the dielectric material each have a free surface side and a support side. The method comprises the steps of positioning the precursor solution layer between a first electrode on the free surface side of the solution and a support for the cast material, providing an electric field between the first electrode and the support, and allowing the precursor solution layer to separate into two phases. The method may be conducted in a continuous or batchwise manner, including dry-cast processes, wet-cast processes, thermal-cast processes, combinations thereof, and modifications thereof The method may also include the additional step of forming the dielectric material into a shape such as, but not limited to, a flat sheet, a pleated sheet, a hollow fiber, and a tube. The precursor solution may comprise a polymer or a polymer precursor, with the dielectric material comprising a polymeric membrane or a polymeric thin film.

Yet another embodiment of the present invention comprises a method for controlling the size and distribution of macrovoid pores in an interfacially polymerized dielectric material. The method comprising the steps of providing two precursor solution layers having an interface therebetween, providing an electric field through the solution layers and the interface, and allowing polymerization to occur at the interface. The dielectric material may comprise a polymeric membrane or a polymeric thin film. There may be an additional step of providing a support for the precursor solution layers and the dielectric material, with one of the precursor solutions between the support and the second precursor solution. The electric field may be configured to control the number, size, depth, and/or spatial distribution of macrovoid pores in the dielectric material. The method may be a continuous or a batchwise process, and it may include the additional step of forming the dielectric material into a shape selected from flat sheets, pleated flat sheets, hollow fibers, and tubes.

BRIEF DESCRIPTION OF THE DRAWINGS

These and other features, aspects, and advantages of the present invention will become better understood with reference to the following description, appended claims, and accompanying drawings, where:

DETAILED DESCRIPTION OF THE INVENTION

Figure 1:
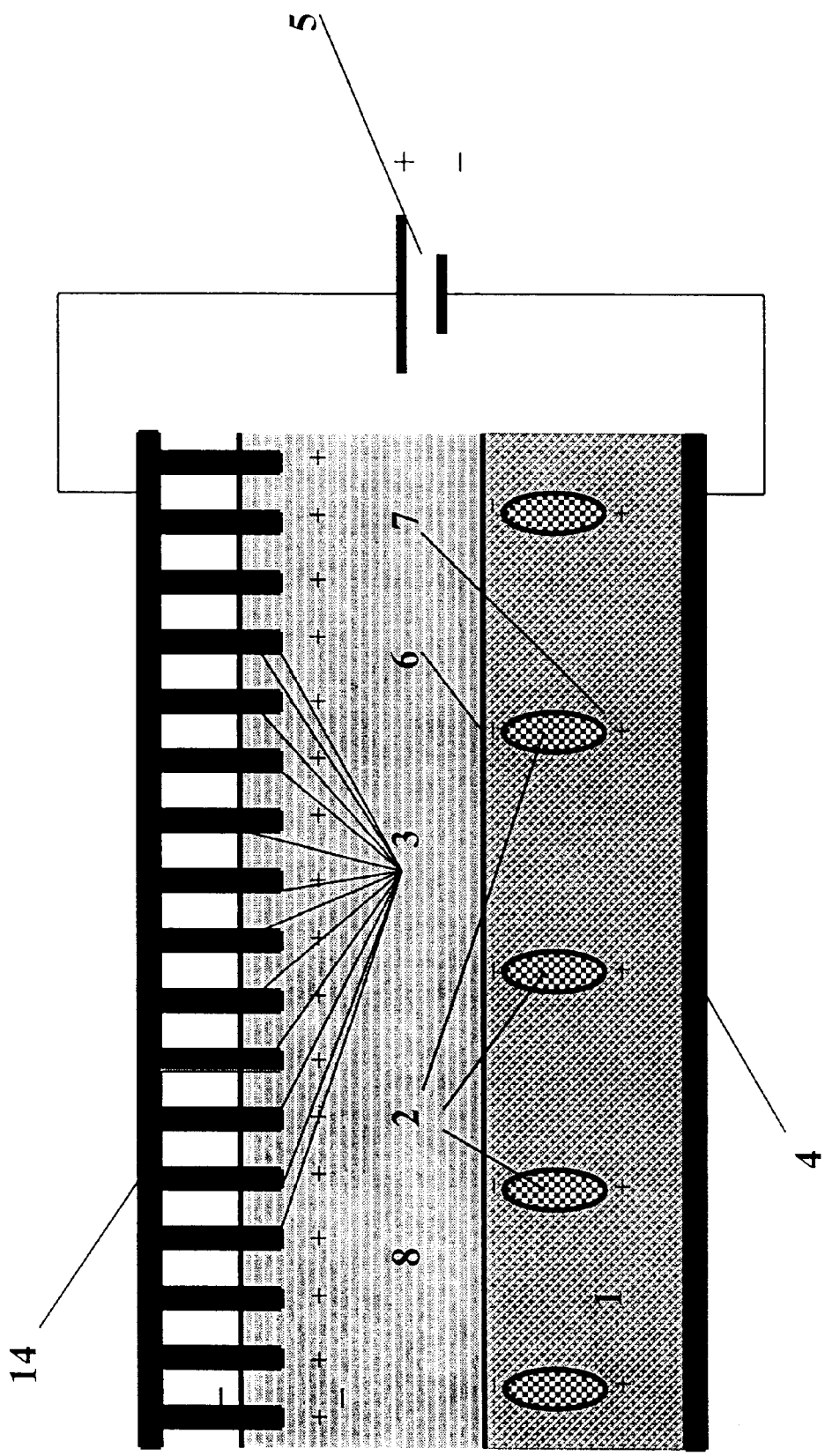
FIG. 1 is a schematic representation of one embodiment of the present invention that can be used to reduce or eliminate formation of macrovoid pores in microporous polymeric membranes.

Broadly, the present invention comprises a method and apparatus for using electric fields to control the pore structure in dielectric materials. In the following discussion, "dielectric" materials are nonconducting or poorly conducting materials. The present invention utilizes an alternating current (ac) or direct current (dc) potential difference maintained between two or more electrically conductive objects disposed on opposing sides of the dielectric solution from which the material is formed. Alternatively, the potential difference can be maintained between one or more electrically conductive objects and ground. The ac or dc potential difference between the electrically conductive objects or between one conductive object and ground establishes an electric field, which may be nonuniform. The present invention has a variety of applications, including, for example, reducing or eliminating the formation of macrovoid pores in the dielectric material and creating a desired pore structure in the dielectric material. This invention is particularly effective for eliminating the formation of macrovoids or controlling the structure of materials that are characterized by very small electrical conductivities; these materials are formed from nonconducting or dielectric fluids. The dielectric materials can be cast in flat sheet, pleated flat sheet, hollow fiber, tubular, or other forms, and the casting process can be conducted continuously or in batches.

All electrostatic phenomena are based on Coulomb's law for the force on a point charge in an electric field, one form of which is given by the following equation:

$$\vec{f} = \rho_e \vec{E} - \frac{\varepsilon_o}{2} E^2 \nabla \kappa + \frac{\varepsilon_o}{2} \nabla \left( E^2 \frac{\partial \kappa}{\partial \rho} \rho \right) \qquad \text{EQN. 1}$$

$$(1) \qquad (2) \qquad (3)$$

Where $\vec{f}$ is the force per unit volume arising from electric field effects, $\rho_e$ is the space charge density, $\vec{E}$ is the electric field strength, $\epsilon_0$ is the permittivity of empty space, K is the dielectric constant, $\rho$ is the mass density, and $\nabla$ denotes the spatial gradient operator.

Term (1) in the above equation is the force contribution owing to the presence of a net space charge $\rho_e$. This is zero in metallic conductors, but may be important in dielectrics. If the dielectric has a nonzero electrical conductivity, this term can contribute via unipolar injection of free charges into the fluid at the electrodes. Even in the absence of injection of charge, this term can be nonzero because of the charge induced at an interface between two fluids having different dielectric constants. This induced space charge effect can be neglected for ac fields of sufficiently high frequency. Term (1) can also be nonzero if the electrical conductivity is a function of either temperature or concentration, because, under these conditions, an induced charge in the bulk of the fluid can result.

Term (2) in the above equation represents the force contribution that arises when the dielectric constant is non-constant. This term is nonzero when there is a discontinuous change in the dielectric constant across an interface. It also is nonzero in the bulk of the fluid when the dielectric constant varies because of temperature or concentration gradients.

Term (3) in the above equation is the electrostriction force contribution. It can be significant when the electric field is nonuniform due either to the electrode configuration or to spatial variations in the dielectric constant.

The intensity, or strength, of an electric field is equal to the change in electrical potential energy per unit distance between the two or more electrodes or between one or more electrodes and ground. In a uniform electric field, the strength is constant with respect to location between the two electrodes or the electrodes and ground. An example of a uniform electric field is that created between two parallel infinitely wide electrodes. In a nonuniform electric field, the strength is not constant with respect to location between the electrodes or the electrodes and ground. An electric field can be either dc or ac, depending on whether the electric field strength is constant or varies periodically in time at some frequency.

There have been relatively few relevant studies of the effects of electric fields on dielectric fluids such as polymers. McLaughlin et al. (McLaughlin J. B., D. Cowden, and S. Arajs, "Increased Flow Rate of Polymer Solutions in Electric Fields," *J. Colloid Interface Sci.*, 65(3) 581–582 (1978)) observed that both dc and ac fields caused increased flow of polymer solutions through cylindrical tubes, presumably because of molecular orientation effects that reduced the viscosity. Krozer et al. (Krozer, S. and H.-J. Cantow, "Precipitation of Polymers From Solution in the Presence of an Electrical Field," *J Polymer Sci., Symposium No. 42*, 1217–1227 (1973)) studied the precipitation of polymers from solution in the presence of dc fields and observed migration of the precipitated polymer toward the anode (i.e. positively charged electrode), presumably because of charge transfer between the solvent and a polymer-rich precipitate. Marand et al. (Marand, H. and R. S. Stein, "Isothermal Crystallization of Poly(vinylidene fluoride) in the Presence of High Static Electric Fields. II. Effect of Crystallization Temperature and Electric Field Strength on the Crystal Phase Content and Morphology," *J Polymer Sci., part B: Polymer Physics*, 27, 1089–1106 (1989)) observed nonuniform morphology when polyvinylidene fluoride polymer was crystallized in a dc field, presumably because the various crystal phases have different dielectric constants. Shojaie et al. (Shojaie, S. S., A. R. Greenberg, and W. B. Krantz, "Use of an Electric Field to Alter Membrane Morphology in a Polysulfone-Polyvinylpyrrolidone Blend," *J Membrane Sci.*, 79, 115–122 (1993)) observed that dc fields caused an increase in the size of macrovoid pores for tubular cellulose acetate polymeric membranes wet-cast from an acetone solution into water, presumably because of the difference in dielectric constants between the polymer solution and surrounding aqueous phase. All of these references are incorporated herein by reference, in their entirety.

In accordance with the present invention, dielectric materials may be fabricated by a phase-separation or interfacial polymerization process wherein the material or its precursor is dissolved in one or more solvents to form a precursor solution, and the solution is cast as a continuous film on a support surface, which may or may not ultimately become a part of the final product. The fabrication process may be a continuous or a batch process, and it may include solvent casting, such as dry casting, wet casting, thermal casting, interfacial polymerization, or combinations thereof. The fabrication process may also involve the use of one or more nonsolvents and/or other additives, such as nucleating agents, surfactants, and plasticizing agents. The material can be fabricated in a planar, pleated sheet, hollow fiber, tubular, spherical, or other regular or irregular geometrical form. Although the preferred materials are polymeric membranes and thin films, the present invention can also be used to control the pore structure in other dielectric materials whose structures are characterized by pores or pore fluid that has a different dielectric constant than that of the surrounding matrix material. Commercial polymeric membranes and thin polymer films are generally fabricated via a continuous process.

The present invention is based on the new discovery that electric fields can be used to control the structure of dielectric materials. During phase-separation casting processes, undesirable macrovoid pores can form as the single-phase polymer solution becomes a dispersion of one liquid phase within another liquid phase and evolves into a sheet-like form. In the case of polymeric membranes and thin films, the continuous liquid phase is polymer-rich, and the dispersed liquid phase is polymer-lean. Macrovoid pores can also form during interfacial polymerization processes. In accordance with the present invention, the number, size, depth, and spatial distribution of these macrovoid pores can be controlled, including reducing or eliminating macrovoid pores during the casting of dielectric materials.

The present invention capitalizes on the difference in dielectric constants between the dispersed and continuous phases that form during the fabrication of the dielectric materials. The dielectric constant is an intrinsic property of each material and varies widely between substances such as water, polymers, and organic solvents. Because the dispersed and continuous liquid phases used in the present invention have different compositions, they have different dielectric constants.

Because the continuous and dispersed phases in a phase-separated polymer solution or in the two solutions used for interfacial polymerization have different compositions, application of either a dc or ac electric field across the polymer solution or solutions induces a force at the interface between the two phases. For example, if the dispersed phase in a phase-separated polymer solution has a higher dielectric constant than the continuous phase and the electric field diverges in the direction from the charged object towards the dispersed phase, the dispersed phase will be attracted toward a charged object on the free, unsupported side of the solution. An example of this situation occurs in the formation of polymeric membranes and thin films, where the dispersed phase may be polymer-lean and comprise polar molecules such as water or low molecular weight alcohols or other such materials. This effect is considerably enhanced as the electric field becomes more nonuniform with the electric field intensity increasing in magnitude as the charged object or objects on the free surface side of the solution is/are approached. If the dispersed phase has a lower dielectric constant than the continuous phase, and/or the field intensity increases toward the support side of the solution, the pores tend to migrate away from the free side of the solution.

Hence, by applying a nonuniform dc or ac electric field across a precursor solution within which phase separation or interfacial polymerization is caused to occur in some manner, the formation of macrovoid pores can be controlled. Any tendency for a small pore to grow into a macrovoid is resisted by an electrical force that prevents the growth of this pore in a direction away from the highest field strength. The field strength can be controlled to determine the number and depth of macrovoids that are formed, and the spatial force distribution can be controlled to determine the spatial distribution of macrovoid pores in the polymeric membrane or thin film. By applying a sufficiently large nonuniform electric field strength during the casting process, it is possible to totally eliminate macrovoid pores from a polymeric membrane or thin porous polymer film.

In accordance with the present invention, the membrane or porous thin film is formed in the vicinity of an appropriate ac or dc electric field. The electric field is created by applying an electric potential across a membrane or film material medium, using two or more conductive objects. Each conductive object may take the form of a plate, a series of interconnected or isolated plates, a rod, a series of interconnected or isolated rods, a combination of interconnected or isolated plates or rods, or a variety of other object geometries. The rods may have transverse cross-sections in the shape of a circle, ellipse, triangle, square, rectangle, or other regular or irregular geometric shape. When a plurality of rods are used, they may have the same or different transverse cross-sectional shapes that can create either diverging or converging electric fields.

In the casting process, the polymer solution or other dielectric medium is contained between a supporting surface and an adjacent liquid or gas phase. Thus, the solution has a support side and a free surface side. The present invention permits the creation of a more asymmetric pore structure whereby the pores closer to the free surface side have a different size than those further away from the support side electrode. This effect on the pore structure can be greatly enhanced by employing higher voltages and more highly nonuniform electric fields.

In the following discussion, a conductive object on the free surface side of the polymer solution, i.e., the surface formed between the polymer solution and the adjacent gas or liquid phase, will be referred to as a free surface side electrode. On the solid support side of the polymer solution, there may be another conductive object, hereafter referred to as a support side electrode. The solution may be in direct contact with the support side electrode, or there may be one or more layers of support material between the solution and the support side electrode. The support side and free surface side electrodes must be at different electrical potentials, or voltages.

Alternatively, either the free surface side or the support side electrode can be omitted if a suitable source of electrical potential energy has one terminal connected to the opposing electrode and the other terminal grounded. In this case, the casting support must also be grounded. If a support side electrode is used, the support side electrode and the free surface side electrode must be at different electrical potentials. If a battery or other power source is used, either the positive or the negative terminal can be grounded. Any suitable battery, dc power supply, or ac power supply known in the art can be used to provide an electrical potential between the electrodes or the electrodes and ground. The electric field can be either dc or ac.

Also alternatively, two or more electrodes at different potentials may be positioned on one side of the solution, either on the support side or the free surface side, so as to provide a non-uniform electric field through the solution during the casting process. For example, two free surface side electrodes could be used to create an electric field with an intensity that increases with distance from the solution.

It should be noted that, as used herein, the term "electrode" refers to an object formed from a conductive material. When the object is in electrical communication with a power source, it does not function as a true electrode, in that no current passes from the object into the solution. It should be appreciated by those skilled in the art that the combination of a free side electrode and either a support side electrode or ground form a capacitor.

The dielectric precursor solution and electrode or electrodes may be arranged horizontally, with the support side electrode below the solution and the free surface electrode above the solution. However, the solution need not be horizontal during the casting process.

For purposes of illustration, the following discussion refers to polymeric membranes and thin films. However, the present invention is not limited to polymeric materials.

In one embodiment of the present invention, illustrated in FIG. 1, a polymeric membrane casting system includes a solution 1 comprising one or more polymers, one or more solvents, and, possibly, one or more nonsolvents or additional solvents, plasticizers, nucleating agents, viscosity-enhancing agents, or surfactants. As shown, the solution 1 is being formed directly onto support side electrode 4. Alternatively, it could be formed onto another surface or composite surface such as another microporous polymer film, webbing, or fabric (not shown), which in turn is underlain by a support. As shown in FIG. 1, this support serves as the support side electrode 4, although this support side electrode could be located externally to the membrane casting system or eliminated altogether if one terminal of the battery or other source of electrical potential energy is connected to ground. In this case, the support would also have to be connected to ground. The support side electrode 4 is connected to the negative (−) terminal of a battery 5. The positive (+) terminal of battery 5 is connected to a free surface side electrode 14 that is above the solution of polymer and other additives 1. Alternatively, the support side electrode 4 could be connected to the positive (+) terminal, and the free surface side electrode 4 could be connected to the negative (−) terminal of battery 5. Also alternatively, another type of power source, such as an ac power supply or a dc power supply, could be used, as long as the two electrodes are maintained at different electrical potentials, or voltages. An array of conductive elements 3 is connected, physically and electrically, to free surface side electrode 14. Conductive elements 3 create a nonuniform electric field having a strength that changes as a function of position in the electric field between the free surface side electrode 4 and support side electrode 14. These elements 3 can be conductive rods having a circular, elliptical, square, rectangular, triangular, or other regular or irregular shaped cross-section. They can have either a constant cross-sectional area or a cross-sectional geometry that changes along the length of the device. Alternatively, a metal or conductive screen having a coarse or fine mesh could be used to create a non-uniform electric field. As shown, conductive elements 3 are cylindrical conductive rods having a constant cross-sectional area and flat ends, although the ends could be hemispherical or have other shapes. In FIG. 1, conductive elements 3 are configured to create one or more local nonuniform electric fields whose intensity decreases with distance away from the free surface side electrode 14 and towards the support side electrode 4. This electric field configuration is useful for reducing or eliminating the occurrence of macrovoid pores 2 formed in polymeric membranes or polymeric thin porous films during the casting process.

The polymeric membrane or polymeric thin porous film 1 can be cast batch-wise or continuously as a liquid onto the support surface consisting of the support side electrode 4 and any other support surfaces such as another microporous polymer film, webbing, fabric, or composite material that may be present. During the casting, an electrical potential difference is maintained between the support side electrode 4 and free surface side electrode 14 via the battery 5 or an alternative source of electrical potential energy. For dry-casting polymeric membranes or thin porous films, electrode 14 or at least a portion of the free end of the conductive elements 3 are located in the gas phase. For wet-casting or interfacial polymerization of polymeric membranes or thin porous films, electrode 14 and the portions of conductive elements adjacent electrode 14 can be located either above or in the nonsolvent liquid phase. As shown in FIG. 1, the free surface side electrode 14 is not immersed in the nonsolvent liquid phase 8. However, the end portion of each of the conductive elements 3 is immersed in the nonsolvent liquid phase 8. The free surface side electrode 14 could be immersed in the nonsolvent liquid phase 8. However, if the nonsolvent liquid phase 8 is conductive, the free surface side electrode 14 and all but the end of that portion of the conductive elements 3 that is immersed in the nonsolvent liquid phase 8 must be insulated. For safety reasons, it may be desirable to insulate the conductive elements entirely.

The electrical potential difference maintained between the support side electrode 4 and the free surface side electrode 14 creates a nonuniform electric field about each of the conductive elements 3. This electric field induces polarization in any macrovoid pores 2 that form in this polymeric membrane or thin porous film 1. This polarization causes an attractive force between the macrovoid 2 and the free surface side electrode 14 and its associated conductive elements 3 via one or more of the forces associated with terms (1), (2), or (3) in EQN. 1.

In FIG. 1 the free surface side electrode 14 and its conductive elements 3 have a positive charge (+). Hence, in this case, the induced polarization in the macrovoid pores 2 would result in a negative charge (−) being located at the end of the macrovoid 2 that is closest to the free surface side electrode 14. If the free surface side electrode had a negative charge, then positive charges in the macrovoid would be located at the end of the pore closest to the free surface side electrode.

Figure 2:
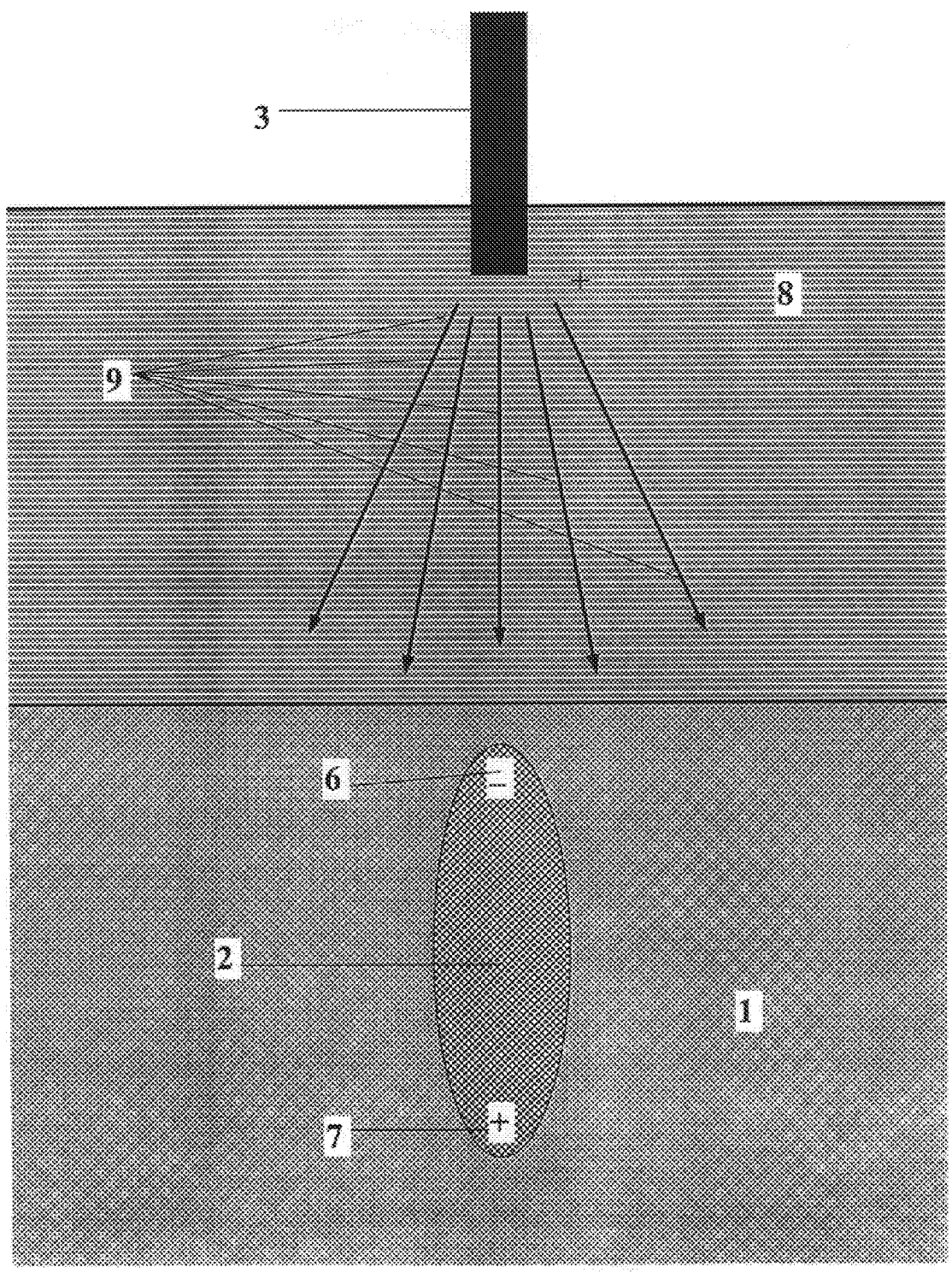
FIG. 2 is a schematic illustration of the force induced on a typical macrovoid pore due to the difference between the dielectric constant of the material within the macrovoid and that of the surrounding liquid and due to the nonuniform electric field whose magnitude increases in the direction of the first electrode, on the free surface side of the precursor solution.

FIG. 2 illustrates the manner in which the present invention reduces or eliminates the occurrence of macrovoid pores 2 in polymeric membranes 1. One of the conductive elements 3 is attached to the free surface side electrode 14 and immersed in the nonsolvent liquid phase 8. In this illustration, the element 3 that is attached to free surface side electrode 14 is shown with a positive (+) charge, although this device could also have a negative (−) charge. The arrows 9 are not parallel to each other, illustrating the nonuniform electric field created by the conductive elements 3. This electric field induces polarization within the macrovoid 2 such that a negative charge (−) 6 is induced at the end of the macrovoid 2 that is closest to conductive element 3, and a positive charge (+) 7 is induced at the end of macrovoid 2 that is farthest from conductive element 3. This attractive force arises because of any one or a combination of terms (1), (2), and (3) in EQN. 1. In particular, the nonuniform electric field 9 increases this attractive force via term (2) in EQN. 1. The attractive force pulls macrovoid 2 towards the conductive element 3 and reduces the ability of the macrovoid 2 to increase in size by growing in the direction away from the conductive element 3. If a sufficient electrical potential is applied to the element 3, it is possible to totally eliminate the occurrence of macrovoid pores 2 in polymeric membranes during the casting process.

The apparatus of the present invention, arranged as shown in FIG. 1, can also be used to control the pore structure in a membrane. In this application, the present invention is used to influence the size and distribution of pores within a polymeric membrane or polymeric thin porous film, in a manner similar to the way macrovoid pores can be reduced or eliminated. The applied electric field 9 induces polarization, shown by charges 6 and 7, in the pores 2 within the polymeric membrane or thin porous film. As a result, pores 2 are attracted towards the conductive elements 3 on free surface side electrode 14. The pores closer to the free surface side electrode 14 experience a strong attractive force. Hence, the growth of these pores is suppressed more than those further removed from the free surface side electrode 14. Hence, the present invention can be used to control the pore size, depth, and pore-size distribution by judicious selection of the electric field strength 9 and design of the free surface side electrode 14 and conductive elements 3.

Although it is generally desirable to obtain a large number of small pores in membranes, it may be desirable to obtain thin films or membranes with larger pores for some applications. This could be accomplished by selecting the polymer, solvent, and, in the case of wet casting, the non-solvent such that the dispersed phase has a lower dielectric constant than the continuous phase, or by using conducting elements on the support side electrode to create an electric field that diverges toward the free side electrode, rather than converging as described above. The distribution of pores in the thin film or membrane can be controlled with the spacing of the rods or screen to obtain a desired field strength, the distance between the free side electrode and the membrane or thin film to obtain a desired field gradient, and the time period during the casting process when power is supplied to the electrode or electrodes.

EXAMPLE 1

Reduction and Elimination of Macrovoid Pores in a Wet-cast Polymeric Membrane

A polymeric membrane was fabricated via the wet-cast method employing a nonsolvent bath that was a conductive liquid. A solution of 15 weight-percent cellulose acetate polymer was prepared in acetone. The solution was then spread batch-wise as a thin film on a glass plate. The support side electrode was a metal plate positioned below the membrane casting system. The free surface side electrode was a metal plate positioned above the membrane casting system. An array of metallic pins having circular cross-sections was attached to the free surface side metal plate. This geometry ensured that the electric field lines were concentrated at the tips of the pins. The metallic pins were insulated, because the water used as the nonsolvent in this example was somewhat conducting. The ends of the pins were immersed into the nonsolvent water bath. A dc power supply was used to apply an electrical potential between the free surface side electrode and the support side electrode. The applied electrical potential was varied in 100-volt increments between 0 volts and 400 volts.

Figure 3:
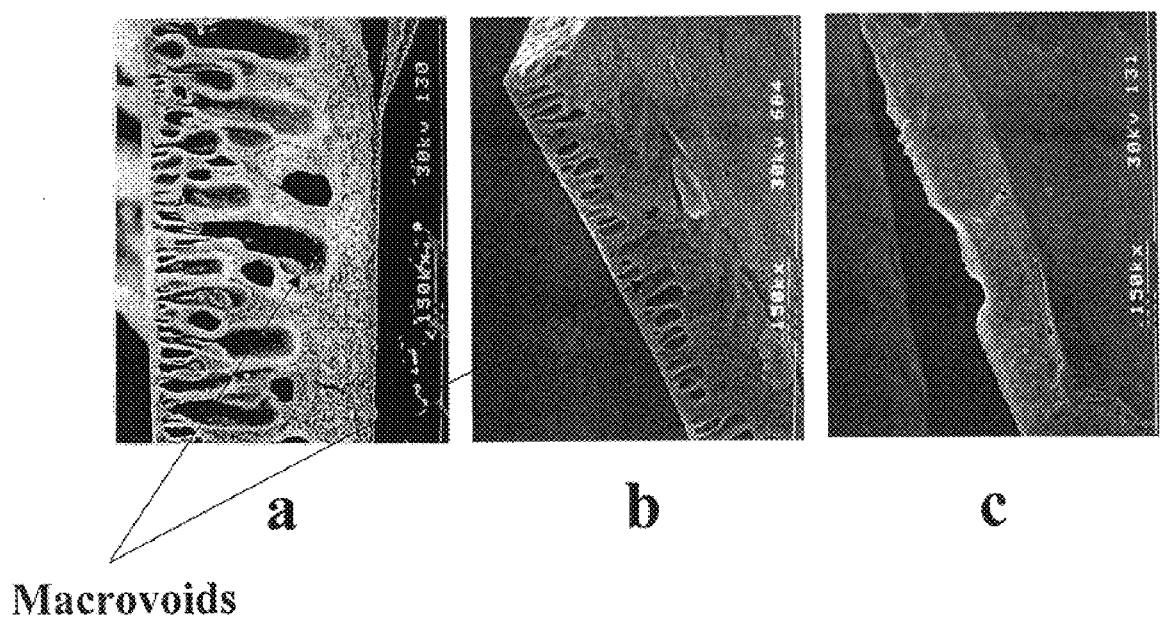
FIG. 3 includes three scanning electron micrographs at a magnification of 150× of cross-sectional views of polymeric membranes wet-cast from a solution of 15 weight percent cellulose acetate in acetone into a nonsolvent bath of water: micrograph (a) shows many very large macrovoid pores formed in the absence of any external electric field, micrograph (b) shows fewer and smaller macrovoid pores formed in the presence of an electrical potential of 200 volts dc, and micrograph (c) shows total suppression of macrovoid pores in the presence of an electrical potential of 400 volts dc.

FIG. 3 shows scanning electron micrographs of cross-sections of the resulting cellulose acetate polymeric membranes at a magnification of 150×. FIG. 3a shows a membrane cast in the absence of any applied electrical potential between the support side electrode and free surface side electrode. Numerous large macrovoid pores are apparent. FIG. 3b shows a membrane cast in the presence of 200 volts dc applied between the support side electrode and free surface side electrode. Application of 200 volts dc using the present invention clearly resulted in a substantial reduction in the number and size of macrovoid pores in the cellulose acetate polymeric membrane. As shown in FIG. 3c, application of 400 volts dc clearly eliminated the macrovoid pores completely in the membrane.

EXAMPLE 2

Reduction and Elimination of Macrovoid Pores in Another Polymeric Membrane

The apparatus described in Example 1 was used to both reduce and eliminate the occurrence of macrovoids in another polymeric membrane fabricated via the wet-cast method. A solution consisting of 10 weight-percent cellulose acetate polymer was prepared in acetone and spread batch-wise as a thin film on a glass plate. The same metal plates were used as support side and free surface side electrodes, respectively, with the array of metallic pins attached to the free surface side electrode. Methanol, a nonconducting liquid, was used as a nonsolvent bath, and the conductive pins were not insulated. The ends of the conductive pins were immersed into the nonsolvent methanol bath, and a dc power supply was used to apply an electrical potential between the free surface side electrode and the support side electrode. The applied electrical potential was varied in 100-volt increments between 0 volts and 200 volts.

Figure 4:
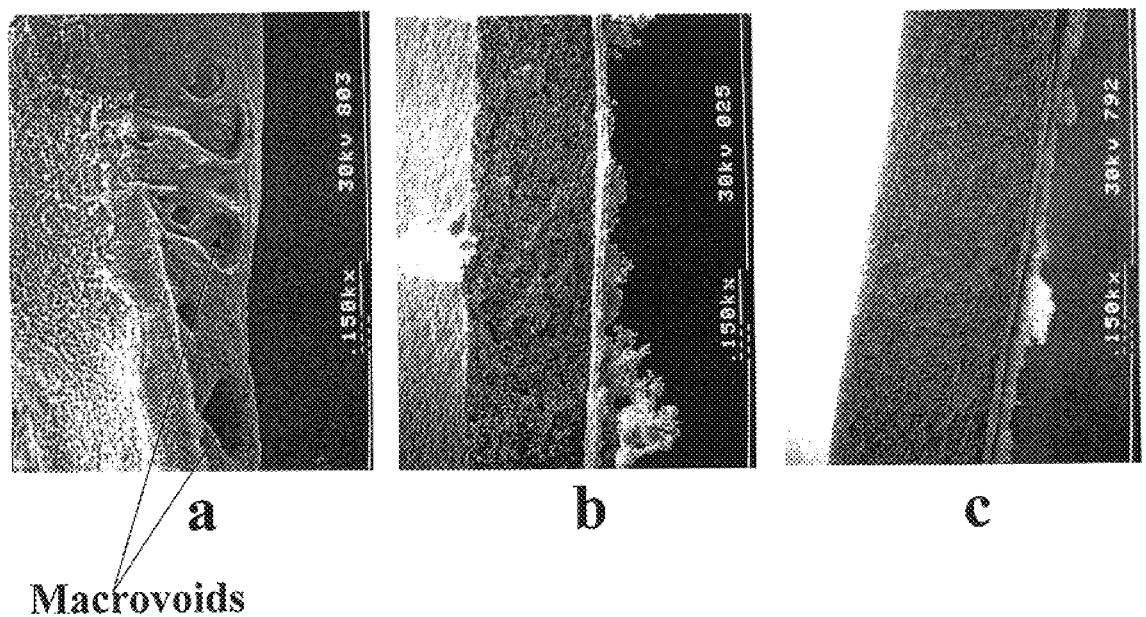
FIG. 4 includes three scanning electron micrographs at a magnification of 150× of cross-sectional views of polymeric membranes wet-cast from a solution of 10 weight percent cellulose acetate in acetone into a nonsolvent bath of methanol: micrograph (a) shows many macrovoid pores formed in the absence of any external electric field, micrograph (b) shows total suppression of macrovoid pores in the presence of an electrical potential of 100 volts dc, and micrograph (c) shows total suppression of macrovoid pores in the presence of an electrical potential of 200 volts dc.

FIG. 4 shows scanning electron micrographs at a magnification of 150× of the cross-sections of the resulting cellulose acetate polymeric membranes. The membrane shown in FIG. 4a was cast in the absence of any applied electrical potential between the support side electrode and the free surface side electrode, and very large macrovoid pores are apparent. The membrane shown in FIG. 4b was cast in the presence of 100 volts dc applied between the support side electrode and the free surface side electrode, and no macrovoid pores are present. The membrane shown in FIG. 4c was cast in the presence of 200 volts dc and also had no macrovoid pores. Further, the membrane shown in FIG. 4c had a smoother surface than the membranes cast in the presence of smaller potentials.

Figure 5:
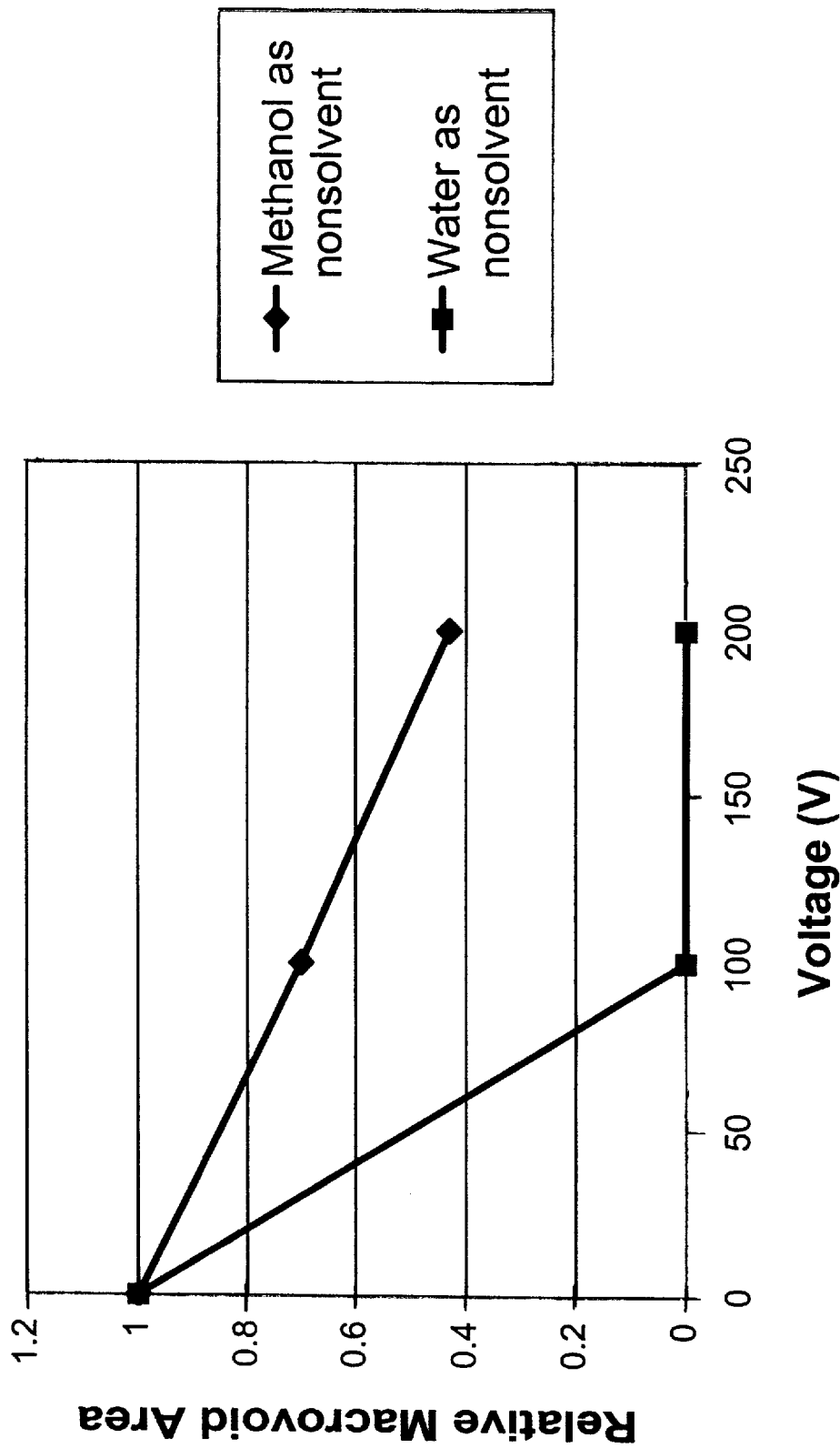
FIG. 5 is a graph of the relative amount of the membrane area occupied by macrovoid pores as a function of the applied dc voltage for polymeric membranes wet-cast from 15 weight percent cellulose acetate in a nonsolvent bath of water (■) and from 10 weight percent cellulose acetate in a nonsolvent bath of methanol (♦).

Thus, the present invention can either reduce the pore size or totally eliminate macrovoid pores in polymeric membranes or polymeric thin porous films, depending on the magnitude of the applied electrical potential between the support side electrode and the free surface side electrode. FIG. 5 shows a graph of percent of the total area of a cellulose acetate membrane occupied by macrovoid pores, plotted as a function of the applied dc voltage between the support side electrode and the free surface side electrode for cellulose acetate membranes wet-cast into a conductive water nonsolvent bath water (■), and wet-cast into a non-conducting methanol nonsolvent bath (♦). The pore area is assumed to be proportional to the macrovoid pore volume. The percent of the total area occupied by macrovoid pores decreases monotonically with increasing applied electrical potential between the support side electrode and the free surface side electrode. If a sufficiently large electrical potential is applied between the support side electrode and the free surface side electrode, it is possible to totally eliminate macrovoid pores.

It should be noted that, to carry out the present invention, the electric field need only be present during the portion of the casting process in which macrovoid pores form. For example, during a wet-casting process for making polymeric membranes or thin films, the macrovoid pores begin to form when the non-solvent contacts the polymer solution, and development of pores decreases as the polymer viscosity increases. Thus, in a continuous process where a moving belt is used to support the precursor solution and the membrane or film, the field need only be applied at the belt position where the macrovoid pores form. A field free of dead spots could be obtained by positioning a single rod- or bar-shaped electrode in proximity to the belt in an orientation substantially parallel to the belt surface and substantially perpendicular to the direction of travel of the belt. Also, the electric field strength and spatial distribution can be tuned to obtain a desired pore distribution and depth in the membrane or thin film. It should also be noted that, for wet-casting processes, the free side electrode and any conductive elements used with it should be insulated if the non-solvent is electrically conductive.

The present invention can be implemented easily and has the added advantage that it can be operated economically. The electrical power requirements to obtain the electric field may be modest, because in at least one embodiment of the invention, substantially no current passes through the fluids used to cast the membranes and thin films.

Further, the pore structure can be influenced without the need for any chemical additives. For example, the pores in the phase-separated polymer solution that are closer to the free surface side electrode (or electrodes) will be more strongly attracted to this electrode (or these electrodes) than those that form in the polymer solution that is further away from this electrode (or these electrodes).

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention.

We claim:

1. An apparatus for controlling the number and size of pores in a dielectric material formed by phase-inversion casting or interfacial polymerization from a precursor solution layer, the solution layer and the dielectric material each having a free surface side and a support side, the apparatus comprising:

at least one first electrode positionable on the free surface side or the support side of the precursor solution layer; and means for maintaining the at least one first electrode at an electrical potential sufficient to provide an electric field through the precursor solution layer.

2. The apparatus of claim 1, wherein:

the means for maintaining comprises a power source having two terminals at different elect potentials;

one terminal of the power source is in electrical communication with the at least one first electrode; and the power source is selected from the group consisting of batteries, ac power supplies, and dc power supplies.

3. The apparatus of claim 2, further comprising a second electrode, and one of the electrodes is disposed on the support side of the precursor solution and the other of the electrodes is disposed on the free surface side of the precursor solution, and wherein the second electrode is in electrical communication with the second terminal of the power source.

4. The apparatus of claim 2, wherein the second terminal of the power source is in electrical communication with a ground.

5. The apparatus of claim 1, additionally comprising one or more conductive elements in electrical communication with the at least one first electrode and spaced apart from the dielectric layer, wherein the conductive elements are adapted to concentrate the electric field lines at the tips of the conductive elements.

6. The apparatus of claim 5, wherein the conductive elements are rods having connected ends attached to the first electrode and free ends directed toward or into the precursor solution layer, each rod having a transverse cross-section in a shape selected from the group consisting of circles, ellipses, squares, rectangles, triangles and irregular geometric shapes.

7. The apparatus of claim 6, wherein at least a portion of each rod has an electrically insulating coating.

8. The apparatus of claim 6, wherein all of the rods have transverse cross-sections of the same shape.

9. The apparatus of claim 1, wherein the first electrode has a screen configuration.

10. The apparatus of claim 1, wherein each electrode and the means for maintaining are selected to decrease the number of macrovoid defects in the dielectric material.

11. The apparatus of claim 1, wherein each electrode and the means for maintaining are selected to control at least one property of the pores in the dielectric material, wherein the property is selected from the group consisting of number, size, depth, and spatial distribution.

12. The apparatus of claim 1, wherein the first electrode and the means for maintaining are adapted to provide a non-uniform electrical field between the at least one first electrode and the support side of the precursor solution layer.

13. The apparatus of claim 1, comprising a plurality of electrodes positionable on the same side of the precursor solution layer.

14. An apparatus for phase-inversion casting or interfacial polymerization of dielectric materials, comprising:

means for supporting a precursor solution layer during a casting process, the solution layer having a support side and a free surface side;

at least one first electrode positionable on the free surface side or the support side of the solution layer and adapted for providing an electric field through the precursor solution layer; and means for maintaining the at least one first electrode at an electrical potential sufficient to provide the electric field.

15. The apparatus of claim 14, wherein:
the means for maintaining comprises a power source having two terminals at different electrical potential;
one terminal of the power source is in electrical communication with the at least one first electrode; and
the power source is selected from the group consisting of batteries, ac power supplies, and dc power supplies.

16. The apparatus of claim 15, further comprising a second electrode, and one of the electrodes is disposed on the support side of the precursor solution and the other of the electrodes is disposed on the free surface side of the precursor solution, and wherein the second electrode is in electrical communication with the second terminal of the power source.

17. The apparatus of claim 15, wherein the second terminal of the power source is in electrical communication with a ground.

18. The apparatus of claim 14, wherein the apparatus is adapted for use in a process type selected from the group consisting of batch-wise casting processes and continuous casting processes.

19. The apparatus of claim 14, wherein the apparatus is adapted for use in a process type selected from the group consisting of dry-cast processes wet-cast processes, thermal-cast processes, interfacial polymerization processes and combinations thereof.

20. The apparatus of claim 14, wherein the means for supporting is adapted for casting the dielectric material into a shape, selected from the group consisting of flat sheets, pleated flat sheets, hollow fibers, and tubes.

21. The apparatus of claim 14, wherein the means for supporting comprises at least one material selected from the group consisting of metals, glasses, ceramics, microporous polymer films, webbing, fabrics, and composite materials.

22. The apparatus of claim 14, wherein the apparatus is adapted to control the number and size of macrovoid pores in the dielectric materials.

23. The apparatus of claim 14, wherein the first electrode and the means for maintaining are adapted to provide a non-uniform electrical field.

24. A method for controlling the number and size of pores in a dielectric material formed by phase-inversion casting from a precursor solution layer, the solution layer and the dielectric material each having a free surface side and a support side, the method comprising the steps of:
providing the precursor solution layer on a support;
providing an electric field passing through the precursor solution; and
allowing the precursor solution layer to separate into two phases.

25. The method of claim 24, wherein:
the step of providing an electric field comprises providing a power source with a first terminal in electrical contact with the first electrode and a second terminal, wherein there is an electrical potential difference between the first and second terminals.

26. The method of claim 25, wherein the step of providing an electric field further comprises providing a second electrode in electrical contact with the second terminal of the power source, and wherein the first and second electrodes are on opposing sides of the solution layer.

27. The method of claim 25, wherein the step of providing an electric field further comprises connecting the second terminal of the power source to ground.

28. The method of claim 25, wherein the power source is selected from the group consisting of batteries, ac power supplies, and dc power supplies.

29. The method of claim 24, wherein:
the precursor solution layer comprises a polymer or a polymer precursor; and
the dielectric material comprises a polymer.

30. The method of claim 24, wherein the dielectric material is selected from the group consisting of membranes and thin films.

31. The method of claim 24, wherein the first electrode comprises one or more conductive elements in electrical communication with the first electrode and spaced apart from the free surface of the membrane or thin film.

32. The method of claim 24, wherein the first electrode has a configuration selected from the group consisting of screens and rods.

33. The method of claim 24, wherein the number and size of macrovoid pores are controlled.

34. A method for phase-inversion casting a dielectric material from a precursor solution layer, the solution layer and the dielectric material each having a free surface side and a support side, the method comprising the steps of:
positioning the precursor solution on a support for the cast material;
providing an electric field passing through the precursor solution; and
allowing the precursor solution layer to separate into two phases.

35. The method of claim 34, wherein:
the providing step comprises providing a power source with a first terminal in electrical contact with the first electrode and a second terminal, wherein there is an electrical potential difference between the first and second terminals.

36. The method of claim 35, wherein the step of providing an electric field further comprises providing a second electrode in electrical contact with the second terminal of the power source, and wherein the first and second electrodes are on opposing sides of the solution layer.

37. The method of claim 35, wherein the providing step further comprises connecting the second terminal of the power source to ground.

38. The method of claim 35, wherein the power source is selected from the group consisting of batteries, ac power supplies, and dc power supplies.

39. The method of claim 34, wherein the method is a continuous or a batchwise process.

40. The method of claim 34, wherein the method is selected from the group consisting of dry-cast processes, wet-cast processes, thermal-cast processes and combinations thereof.

41. The method of claim 34, comprising the additional step of forming the dielectric material into a shape selected from the group consisting of flat sheets, pleated flat sheets, hollow fibers, and tubes.

42. The method of claim 34, wherein:
the precursor solution layer comprises a polymer or a polymer precursor; and
the dielectric material comprises a polymeric membrane or a polymeric thin film.

43. The method of claim 34, wherein the first electrode comprises one or more conductive elements in electrical communication with the first electrode and spaced apart from the free surface of the membrane or thin film.

44. The method of claim 34, wherein the first electrode is configured as a screen.

45. The method of claim 34, wherein the electrodes are configured to control the number and size of macrovoid pores in the dielectric material.

46. A method for controlling the size and distribution of macrovoid pores in an interfacially polymerized dielectric material, the method comprising the steps of:

provinding two precursor solution layers having an interface therebetween;

providing an electric field through the solution layers and the interface; and allowing polymerization to occur at the interface.

47. The method of claim 46, wherein the dielectric material comprises a polymeric membrane or a polymeric thin film.

48. The method of claim 46, further comprising the step of providing a support for the dielectric material, and wherein:

one of the precursor solution layers is in contact with the support; and wherein the precursor solution layers and the dielectric material have a support side adjacent the support and an opposing free side.

49. The method of claim 48, wherein the electric field is configured to control at least one property selected from the group consisting of the number, size, depth, and spatial distribution of macrovoid pores in the dielectric material.

50. The method of claim 46, wherein the method is a continuous or a batchwise process.

51. The method of claim 46, comprising the additional step of forming the dielectric material into a shape selected from the group consisting of flat sheets, pleated flat sheets, hollow fibers, and tubes.

52. A method in which a precursor solution layer is positioned between a first electrode on the free surface side of the solution and a support for the cast material for phase-inversion casting a dielectric material from a precursor solution layer, the solution layer and the dielectric material each having a free surface side and a support aide, the method comprising the steps of: providing an electric field between the first electrode and the support; and allowing the precursor solution layer to separate into two phases.

* * * * *